United States Patent
Kim

(10) Patent No.: US 12,278,656 B2
(45) Date of Patent: Apr. 15, 2025

(54) DETECTOR AND METHOD OF DETERMINING VALIDITY FOR DETERMINATION ON PRESENCE OF SPECIFIC SIGNAL OF DETECTOR

(71) Applicant: BG T&A CO., Gunpo-si (KR)

(72) Inventor: Byung Gon Kim, Suwon-si (KR)

(73) Assignee: BG T&A CO., Gunpo-si (KR)

( * ) Notice: Subject to any disclaimer, the term of this patent is extended or adjusted under 35 U.S.C. 154(b) by 199 days.

(21) Appl. No.: 18/332,962

(22) Filed: Jun. 12, 2023

(65) Prior Publication Data

US 2023/0412204 A1  Dec. 21, 2023

(30) Foreign Application Priority Data

Jun. 13, 2022  (KR) .................. 10-2022-0071617

(51) Int. Cl.
*H04B 1/10* (2006.01)
*H04B 17/00* (2015.01)

(52) U.S. Cl.
CPC ........... *H04B 1/1027* (2013.01); *H04B 17/00* (2013.01)

(58) Field of Classification Search
CPC .................. H04B 1/1027; H04B 17/00
See application file for complete search history.

(56) References Cited

U.S. PATENT DOCUMENTS

| 2010/0000395 A1* | 1/2010 | Walker, II | G10H 1/0008 84/616 |
| 2019/0370678 A1* | 12/2019 | Lee | G01R 29/0892 |
| 2020/0328920 A1* | 10/2020 | Sung | H04B 1/0475 |
| 2023/0412204 A1* | 12/2023 | Kim | H04B 1/1027 |

* cited by examiner

*Primary Examiner* — Jaison Joseph

(57) ABSTRACT

A method of determining validity for determination on presence of a specific signal of a detector according to an embodiment of the present disclosure includes: (a) receiving a synthesized signal generated from an outside by the detector; (b) acquiring a plurality of frequency domain calculation values related to the synthesized signal; (c) determining the presence of at least one specific signal based on the plurality of frequency domain calculation values; and (d) determining the validity for the determination on the presence of the specific signal based on a frequency domain scatter plot for the plurality of frequency domain calculation values.

9 Claims, 6 Drawing Sheets

DETECTOR AND METHOD OF DETERMINING VALIDITY FOR DETERMINATION ON PRESENCE OF SPECIFIC SIGNAL OF DETECTOR

CROSS-REFERENCE TO RELATED APPLICATIONS

This application claims the benefit of Korean Patent Application No. 10-2022-0 071617, filed on Jun. 13, 2022, the contents of which are all hereby incorporated by reference herein in their entirety.

TECHNICAL FIELD

The present disclosure relates to a detector and a method of determining validity for determination on presence of a specific signal of the detector.

BACKGROUND

Conventional radio frequency signals are widely used as a method for inducing safe driving, such as being used in a speed gun to deliver various pieces of information to a vehicle or to measure the speed of a vehicle. As such radio frequency signals are used, the demand for detectors for detecting radio frequency signals is also naturally increasing.

In general, a detector receives a radio frequency signal transmitted from the outside and demodulates the received signal using various circuits. Then, based on the demodulated signal, it is determined whether the radio frequency signal has been received. The detector that determines that the radio frequency signal has been received may execute a subsequent operation according to its mounting purpose. For example, the detector may be configured to output a specific notification to a user.

Accordingly, the reliability of a detector depends on the validity of the determination about the signal to be detected. However, in modern society, signals are transmitted/received for various purposes, and as a result, detectors are also exposed to a lot of noise during operation. These noises are factors that cause malfunctions of the detector and lower reliability in particular.

Such noise is often caused by a frequency shift keying (FSK) method or multiple frequency shift keying (MFSK) method. This is because a signal of a frequency band intended to be detected may be generated during a frequency modulation process.

As an example, it is assumed that a detector is configured to detect continuous wave signals of X band (approximately, 10 GHz band), K band (approximately 24 GHz band), and Ka band (approximately, 34 GHz band). These detectors often cause malfunctions due to noise from collision avoidance systems (CAS, K-band) of automobiles, and minor lobes and side lobes of cell towers.

SUMMARY

An aspect of the present disclosure is directed to providing a detector capable of highly reliable determination of presence of a specific signal and a method of determining validity for the determination on the presence of the specific signal of the detector.

The aspects of the present disclosure are not limited to those mentioned above, and other aspects not mentioned herein will be clearly understood by those skilled in the art from the following description.

The method of determining the validity for the determination on the presence of the specific signal of the detector according to an embodiment of the present disclosure includes: (a) receiving a synthesized signal generated from an outside by the detector; (b) acquiring a plurality of frequency domain calculation values related to the synthesized signal; (c) determining the presence of at least one specific signal based on the plurality of frequency domain calculation values; and (d) determining the validity for the determination on the presence of the specific signal based on a frequency domain scatter plot for the plurality of frequency domain calculation values.

In stage (d), the validity for the determination on the presence of the specific signal may be determined by comparing the frequency domain scatter plot with a preset reference scatter plot.

In stage (d), the reference scatter plot and the frequency domain scatter plot may be calculated and compared based on a mean absolute deviation (MAD) method.

The reference scatter plot may be measured based on a reference signal that does not include the specific signal and includes noise equal to or less than a preset intensity.

In stage (d), there may be further included, based on an invalid determination that the determination on the presence of the specific signal is not valid, (e) receiving a new synthesized signal after a preset time from a time point when the invalid determination is determined, and (f) performing stages (b), (c) and (d) based on the new synthesized signal.

There may be further included (g) setting a frequency band for the specific signal.

In stage (c), the presence of the specific signal may be determined based on a peak value having a critical intensity in the frequency band among the plurality of frequency domain calculation values.

In stage (b), the plurality of frequency domain calculation values may be acquired by Fourier transforming a signal obtained by mixing a local frequency signal generated by the detector and the synthesized signal.

In stage (d), there may be included, based on a valid determination that the determination on the presence of the specific signal is valid, (h) predicting a change value of the peak value when the local frequency signal is a change frequency different from an existing frequency; (i) actually changing a frequency of the local frequency signal to the change frequency; (j) acquiring a plurality of new frequency domain values based on the change frequency; and (k) comparing the change value with a comparison value having a critical intensity in the frequency band among the plurality of new frequency domain calculation values, and identifying the valid determination.

The detector according to an embodiment of the present disclosure includes: a reception portion for receiving a synthesized signal generated from an outside; a calculation portion for acquiring a plurality of frequency domain calculation values related to the synthesized signal; a signal determination portion for determining presence of at least one specific signal based on the plurality of frequency domain calculation values; and an validity determination portion for determining validity for determination on the presence of the specific signal based on a frequency domain scatter plot for the plurality of frequency domain calculation values.

Other details of the present disclosure are included in the detailed description and drawings.

According to embodiments of the present disclosure, at least the following benefits are provided.

A detector and signal detection method with excellent ability to distinguish between noise and a desired signal may be provided.

The benefits of the present disclosure are not limited thereto, and the disclosure encompass other various benefits.

DETAILED DESCRIPTION

Figure 1:
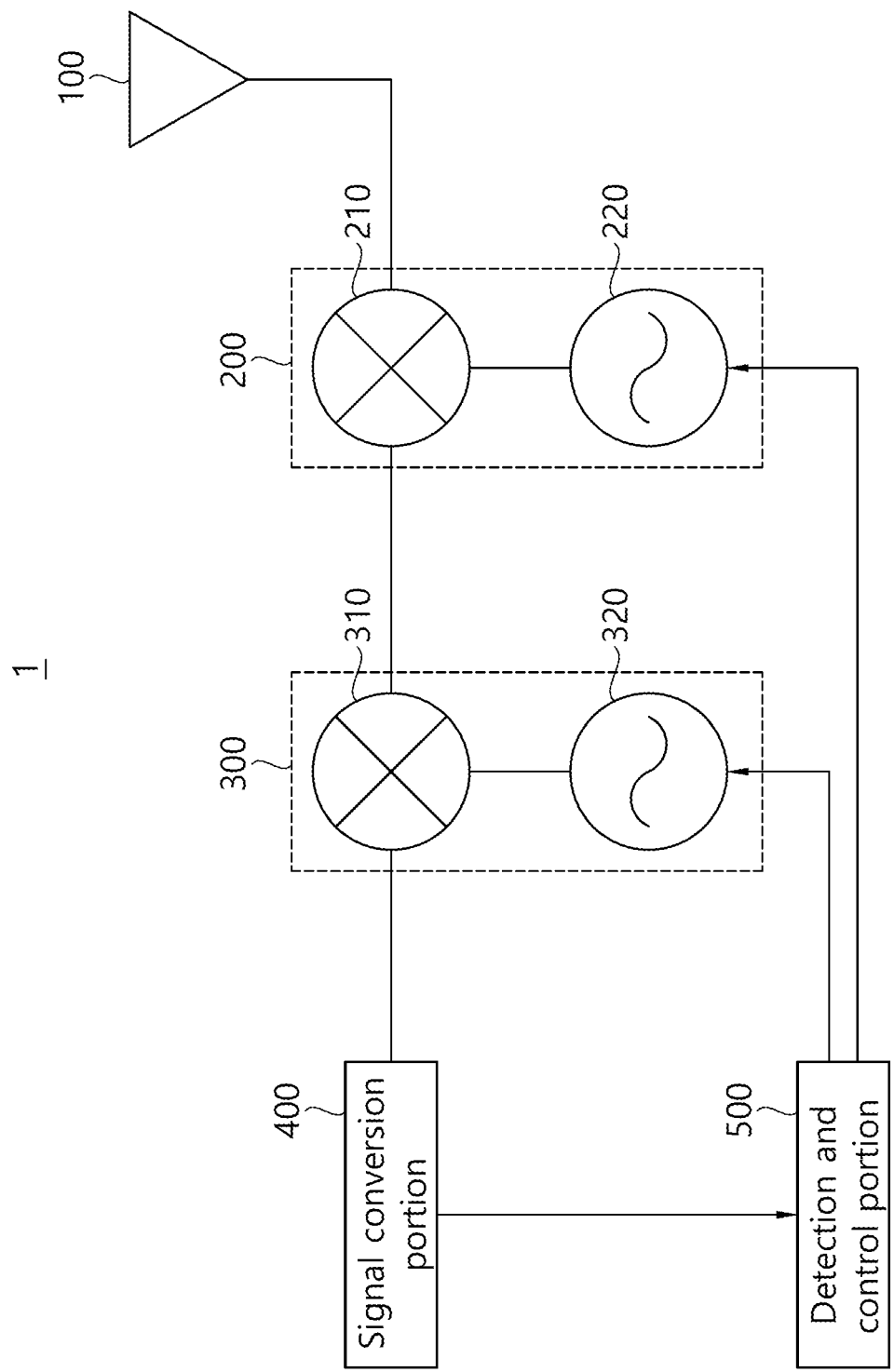
FIG. 1 is a diagram illustrating the structure of a detector according to an embodiment of the present disclosure.

Advantages, features, and methods of accomplishing the same of the present disclosure will become apparent with reference to embodiments described in detail below together with the accompanying drawings. However, the present disclosure is not limited by embodiments disclosed hereinafter, and may be implemented in various forms. Rather, these embodiments are provided to so that this disclosure will be through and complete and will fully convey the scope of the present disclosure to those skilled in the technical field to which the present disclosure pertains, and the present disclosure will only be defined by the appended claims.

In addition, the embodiments described herein will be described with reference to cross-sectional diagrams and/or schematic diagrams, which are ideal exemplary views of the present disclosure. Accordingly, variations from the shapes of the exemplary diagrams as a result, for example, of manufacturing techniques and/or tolerances are to be expected. In addition, in each drawing illustrated in the present disclosure, each component may be illustrated somewhat enlarged or reduced in consideration of convenience of explanation. Like reference numerals designate like components throughout the specification.

A "mixed signal" mentioned below may mean a signal received from the outside through an antenna or the like. For example, the mixed signal may be a mixture of a specific signal intended for detection and noise. Alternatively, the mixed signal may be a signal that does not include a specific signal and is configured of noise.

A "frequency domain calculation value" mentioned below may be a value calculated based on the conversion of analog data for a signal into digital data. More specifically, a detector may sample and process analog data of the received signal with digital data. The frequency domain calculation value (including signal intensity information according to frequency) may be acquired by converting information (including signal intensity information over time) on a signal discretized into digital data through fast Fourier transform (FFT).

Hereinafter, the present disclosure will be described with reference to the drawings for explaining a detector and a method of determining validity for determination on the presence of a specific signal of the detector according to an embodiment of the present disclosure.

FIG. 1 is a diagram illustrating the structure of a detector according to an embodiment of the present disclosure. In this connection, the configuration illustrated in FIG. 1 is illustrated by way of example to help understanding of the present disclosure, and the configuration of the detector according to an embodiment of the present disclosure is not limited to the configuration illustrated in FIG. 1. It should be understood that the detector according to an embodiment of the present disclosure may include an appropriately modified structure in order to perform the purposes and functions of the present disclosure described below.

As illustrated in FIG. 1, a detector 1 according to an embodiment of the present disclosure may be configured to include a reception portion 100, a first signal processing portion 200, a second signal processing portion 300, a signal conversion portion 400, and a detection and control portion 500.

The reception portion 100 may include an antenna for receiving a mixed signal transmitted from the outside. For example, the reception portion 100 may be configured to receive a mixed signal by including antennas of various structures such as a horn antenna and a patch antenna.

The first signal processing portion 200 may process the received high-frequency synthesized signal with an intermediate frequency band signal. For example, the first signal processing portion 200 may mix a high-frequency mixed signal of several tens of GHz or more with a local frequency and convert the same into a signal having a frequency of several hundred MHz to several GHz or less.

The first signal processing portion 200 may include a first oscillator 220 and a first mixer 210.

The first oscillator 220 may be a local oscillator that generates a first local frequency signal having a first local frequency. In more detail, the first oscillator 220 may be a voltage controlled oscillator (VCO) whose frequency is changed according to an applied voltage. In addition, the first oscillator 220 may be configured to include a phase locked loop. The phase locked loop may be used to fix the oscillation frequency of the first oscillator 220 or to vary the frequency of the first oscillator 220 at regular intervals.

The first local frequency signal oscillated by the first oscillator 220 may be determined in consideration of a frequency band of specific signals to be detected. For example, the first oscillator 220 may be set to correspond to an X-band radio frequency signal at a fundamental frequency. In addition, the first oscillator 220 may be set so that a first harmonic wave corresponds to a radio frequency signal of a K band. In addition, the first oscillator 220 may be set so that a second harmonic wave corresponds to the radio frequency signal of a Ka band.

The first mixer 210 may be a mixer that down-converts a frequency by mixing the mixed signal and the first local frequency signal. Hereinafter, the signal output from the first mixer 210 is referred to as a first output signal for convenience of description. As described above, the first output signal may be a signal having a frequency of several hundred MHz to several GHz or less.

Although not illustrated, if necessary, the first signal processing portion 200 may include a band pass filter and an amplifier.

The second signal processing portion 300 may receive the first output signal, convert the same into a second output signal, and process the same. The second output signal may be, for example, a signal having a frequency of several to hundreds of MHz.

The second signal processing portion 300 may include a second oscillator 320 and a second mixer 310.

The second oscillator 320 may be a local oscillator that generates a second local frequency signal having a second local frequency. In more detail, the second oscillator 320 may be a VCO whose frequency is changed according to an applied voltage. In addition, the second oscillator 320 may be configured to include a phase locked loop. The phase locked loop may be used to fix the oscillation frequency of the second oscillator 320 or to vary the frequency of the second oscillator 320 at regular intervals.

The second mixer 310 may be a mixer that down-converts a frequency by mixing the first output signal and the second local frequency signal. Hereinafter, the signal output from the second mixer 310 is referred to as a second output signal for convenience of description. As described above, the second output signal may be a signal having a frequency of several to several hundred MHz.

Although not illustrated, if necessary, the second signal processing portion 300 may include a band pass filter and an amplifier.

The signal conversion portion 400 may be a component that receives the second output signal and samples the same with a digital signal. To this end, the signal conversion portion 400 may include an ad converter. The digital signal converted through the ad converter may be delivered to the detection and control portion.

The detection and control portion 500 may be a processor unit that analyzes a digital signal and determines whether a specific signal is present in the mixed signal. In addition, the detection and control portion 500 may be provided to change the frequency of the first oscillator 220 and the second oscillator 320 by applying a control signal to the oscillator 220 and the second oscillator 320.

In more detail, the detection and control portion 500 may include lower components of a control portion, a calculation portion, a signal determination portion, a validity determination portion, and a notification signal transmission portion. In this connection, the control portion, the calculation portion, the signal determination portion, the validity determination portion, and the notification signal transmission portion are classified according to their functions for convenience, but in reality, at least one or more thereof may be processed by one processing unit. Alternatively, each of the components may be displayed by any one program, or a plurality thereof may be displayed by one program.

The control portion may be an element that generates frequency control signals of the first oscillator 220 and the second oscillator 320 and adjusts frequencies generated by the first oscillator 220 and the second oscillator 320.

The calculation portion may be configured to calculate a plurality of frequency domain calculation values and a frequency domain scatter plot using the received digital signal. First, the calculation portion may output a plurality of frequency domain calculation values by using signal intensity data over time included in a digital signal as an input value. In this connection, the calculation portion may output a frequency domain calculation value using FFT as described above.

The frequency domain scatter plot may be a value obtained by calculating a scatter plot for a plurality of frequency domain calculation values in the frequency domain. In more detail, the frequency domain scatter plot may be calculated using a mean absolute deviation (MAD) method (Equation 1 below).

$$\frac{1}{n}\sum_{i=1}^{n}|x_i - m(X)| \qquad \text{[Equation 1]}$$

In the above equation, n may be a number of frequency domain calculation values, $x_i$ may be an intensity value of each frequency domain calculation value, and m(X) may be an average intensity value of a plurality of frequency domain calculation values.

The reason why the calculation portion calculates the frequency domain scatter plot using the MAD method may be due to robust characteristics of the MAD method. Details thereon will be described later.

Figure 2:
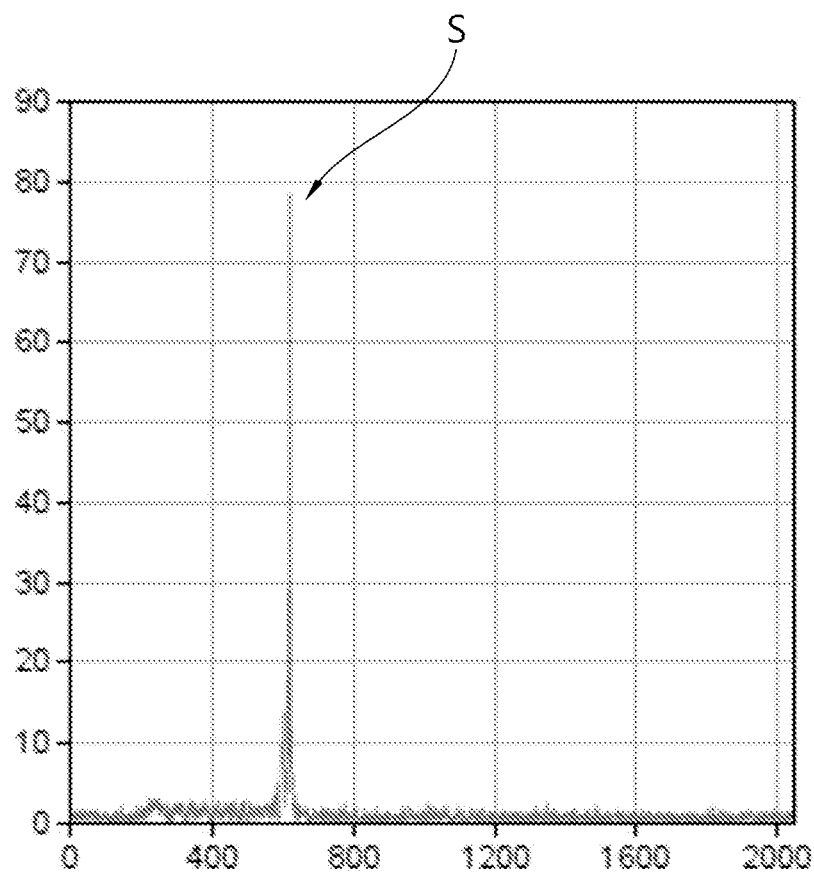
FIG. 2 is a diagram illustrating an FFT graph for a case where a specific signal is present.

The signal determination portion may be configured to determine whether a specific signal is present based on a plurality of frequency domain calculation values. Referring to FIG. 2 in order to help the understanding of a method of determining, by the signal determination portion, the presence of a specific signal, FIG. 2 is a diagram illustrating an FFT graph for a case where a specific signal is present.

As illustrated in FIG. 2, when a plurality of frequency domain calculation values are represented in a graph, a portion corresponding to the frequency of a specific signal S, which is a continuous wave, may be expressed as a peak value. The signal determination portion may use this characteristic to find a peak value having a critical intensity, different from other frequency domain calculation values.

In this connection, a specific frequency domain calculation value having a critical intensity may mean that there is a significant difference in intensity from an adjacent frequency domain calculation value in the frequency domain. For example, a peak value is a value that is abnormally out of distribution in the distribution of frequency domain calculation values, and may mean an outlier.

The signal determination portion may be set to determine that a specific signal is present when the identified peak value is a frequency matching a preset frequency band. Alternatively, the signal determination portion may be set to understand the presence of a peak value only in a preset frequency band.

In this connection, the preset frequency band may be set in consideration of characteristics of a signal that has passed through the second mixer 310. For example, when a peak value is present in a first frequency range, the signal determination portion may determine that a specific signal corresponding to an X band is present. In addition, when a peak value is present in a second frequency range, the signal determination portion may determine that a specific signal corresponding to a K band is present. In addition, when a peak value is present in a third frequency range, the signal determination portion may determine that a specific signal corresponding to a Ka band is present.

Figure 3:
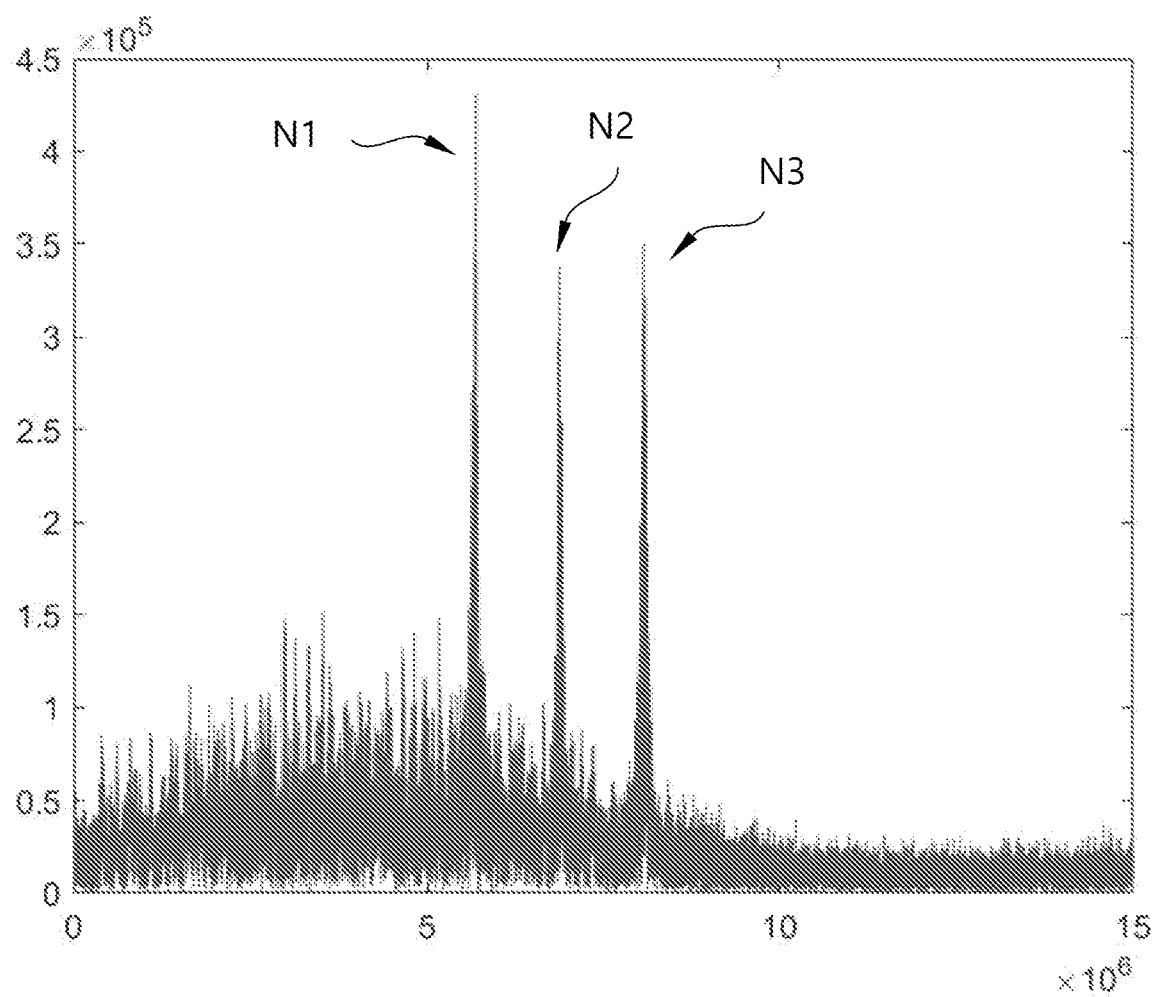
FIG. 3 is an exemplary graph acquired by FFT transforming an FSK signal or an MFSK signal.
Figure 4:
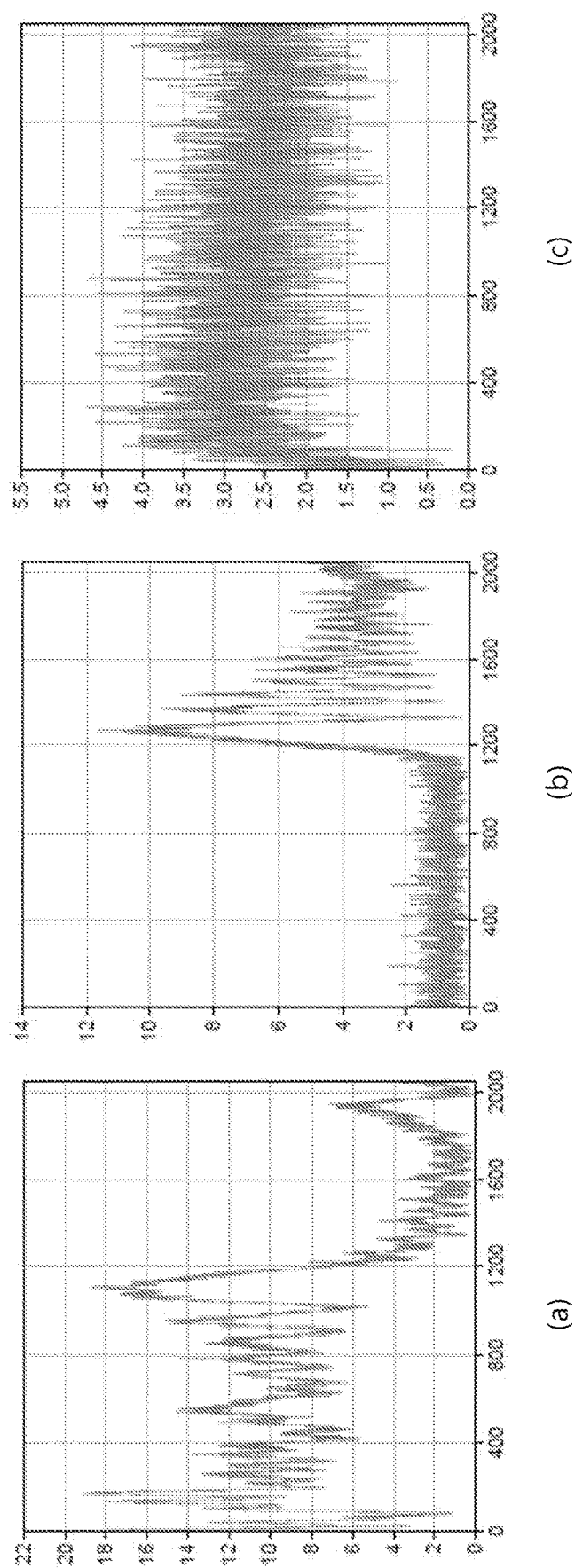
FIG. 4 is an exemplary graph acquired by FFT transforming noise.

The validity determination portion may verify the validity for determination of the signal determination portion based on the frequency domain scatter plot. Referring to FIGS. 3 and 4 in order to help the understanding of a method of verifying, by the validity determination portion, validity for determination of the presence of a specific signal, FIG. 3 is an exemplary graph acquired by FFT transforming an FSK signal or an MFSK signal. In addition, FIG. 4 is an exemplary graph acquired by FFT transforming noise.

Among noise, a particular issue is, as in the case of FIG. 3, a case in which noise also has peak values N1, N2, and N3 in a specific frequency band. Hereinafter, peak values by noise are referred to as noise peak values N1, N2, and N3 in order to distinguish the same from valid peak values.

In this connection, when the noise peak values N1, N2, and N3 are included in at least one of the first frequency range, the second frequency range, and the third frequency range, even though a specific signal is not actually present, the signal determination portion may determine a presence determination that a specific signal is present.

In consideration of the characteristics of noise, the validity determination portion distinguishes whether the specific signal determined by the signal determination portion is actually caused by a specific signal or what is caused by noise is erroneously determined.

Specifically, as illustrated in FIGS. 3 and 4, an FFT graph by noise may take an excited form in many frequency domains. More specifically, in FIGS. 4(A) and 4(B), some bands may be excited due to noise caused by cell towers or FSK or MFSK signals. In addition, in FIG. 4(C), the FFT graph may be excited in the entire frequency band to be detected by the detector 1 due to noise caused by cell towers or FSK or MFSK signals.

Herein, the excited form may mean that a graph is entirely or partially biased upward along a Y-axis, but not that only a specific frequency has a strong value. For this reason, when noise is received, a significant difference in the value occurs between the frequency domain scatter plot of noise and the frequency domain scatter plot when only a specific signal is received.

In consideration of these characteristics, the validity determination portion may compare the reference scatter plot calculated based on the reference signal with the frequency domain scatter plot for the synthesized signal, and verify the validity of the presence determination based on the comparison.

Herein, the reference signal may be a mixed signal having a specific intensity or less. In addition, the specific intensity may be set to be similar to the intensity of the signal received by the detector 1 in an area where the influence of other signal transmitting equipment such as a speed gun or CAS equipment is insignificant. The reference scatter plot may be calculated in the same way as or similar to the frequency domain scatter plot in the MAD method.

As described above, since the MAD method has robust characteristics, the influence of a peak value may be small. Thus, a difference between a frequency domain scatter plot by a valid synthesized signal (hereinafter referred to as a valid signal) in which only a specific peak value is present and a reference scatter plot may not be large. On the contrary, there is a very large difference between the frequency domain scatter plot and the reference scatter plot due to noise (hereinafter referred to as invalid signal) that takes the form of an overall excitation.

Based thereon, when the frequency domain scatter plot by the synthesized signal has a difference of a preset value or less from the reference scatter plot, the validity determination portion determine the presence determination to be valid. Conversely, when the frequency domain scatter plot by the synthesized signal has a difference that exceeds a preset value from the reference scatter plot, the validity determination portion determines that the presence determination is invalid (determined as a peak value due to noise, not a specific signal).

The notification signal transmission portion may output a notification signal notifying a user of the presence of a specific signal when the validity determination portion determines that the presence determination is valid. For example, the notification signal may be a signal formed so that a speaker interlocked with the detector 1 outputs a sound. Alternatively, the notification signal may be a signal formed so that a display interlinked with the detector 1 outputs a specific display.

In the above description, data that is the basis for calculation and determination may be directly/indirectly received by a component that calculates and determines data from a component that generates the data.

Figure 5:
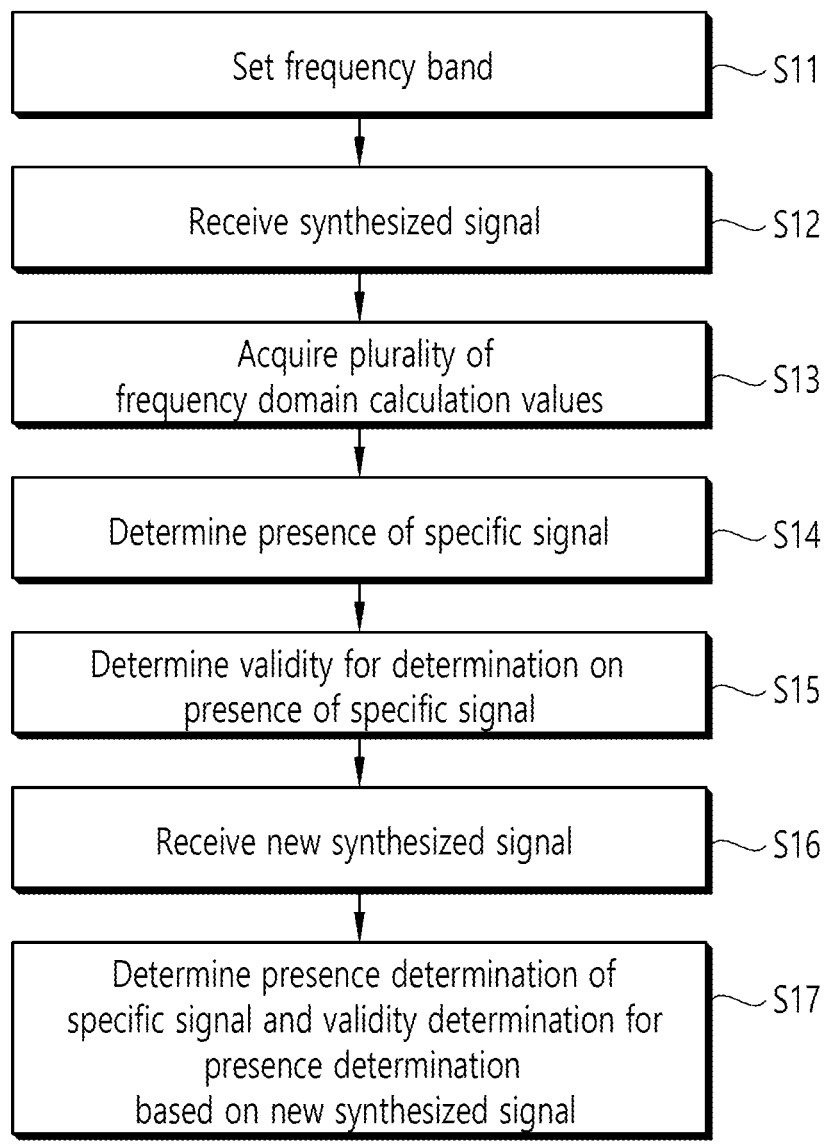
FIG. 5 is a flowchart of a method of determining validity for determination on the presence of a specific signal according to a first embodiment of the present disclosure.

Hereinafter, with reference to FIG. 5 based on the above description, a method of determining validity for determination on the presence of a specific signal of the detector according to a first embodiment of the present disclosure will be described. FIG. 5 is a flowchart of a method of determining validity for determination on the presence of a specific signal according to a first embodiment of the present disclosure.

As illustrated in FIG. 5, the method of determining the validity for the determination on the presence of a specific signal of the detector according to a first embodiment of the present disclosure may include: setting a frequency band (S11); receiving a synthesized signal (S12); acquiring a plurality of frequency domain calculation values (S13); determining the presence of the specific signal (S14); determining the validity for determination on the presence of the specific signal (S15); receiving a new synthesized signal (S16); and determining the presence determination of the specific signal and a validity determination for the presence determination based on the new synthesized signal (S17).

In the setting of the frequency band (S11), the frequency band used when the signal determination portion determines the presence of a specific signal may be set. When a peak value is present within the set frequency band, it may be determined that a specific signal is present in the determination of the presence of the specific signal (S14).

In the reception of the synthesized signal (S12), the externally generated synthesized signal may be received by the reception portion 100 of the detector 1. The synthesized signal received in this stage may be received by the detection and control portion 500 through the first signal processing portion 200, the second signal processing portion 300, and the signal conversion portion 400.

In the acquisition of the plurality of frequency domain calculation values (S13), the calculation portion of the detection and control portion 500 may calculate a plurality of frequency domain calculation values based on the sampled digital signal.

In the determination of the presence of the specific signal (S14), the signal determination portions determines whether the specific signal is included in the synthesized signal based on the plurality of frequency domain calculation values. Hereinafter, for convenience of description, a determination that a specific signal is present is referred to as a presence determination, and a determination that a specific signal is not present is referred to as an absence determination.

In the determination of the validity for the presence determination of the specific signal (S15), the calculation portion may calculate a frequency domain scatter plot based on a plurality of frequency domain calculation values. In addition, the validity determination portion may determine the validity for the presence determination by comparing a reference scatter plot and a frequency domain scatter plot. In this connection, the reference scatter plot may be recorded in advance in the previous stage.

In addition, this stage may proceed when the presence determination is determined in the determination of the presence of the specific signal (S14). When the absence determination is determined, this stage may not proceed. When the absence determination is determined, the reception of the new synthesized signal (S16) may be performed instead of this stage. Hereinafter, for convenience of explanation, a judgment that the presence determination is valid is referred to as a valid judgment, and a determination that the presence determination is invalid is referred to as an invalid determination.

When the absence determination is determined in the determination of the presence of the specific signal (S14) or when the invalid determination is determined in the determination of the validity for the presence determination of the specific signal (S15), the reception of the new synthesized signal (S16) may be performed.

For example, When the absence determination is determined in the determination of the presence of the specific signal (S14) or when the invalid determination is determined in the determination of the validity for the presence determination of the specific signal (S15), the detector 1 may be operated again after a predetermined time after stopping the operation for a while. Alternatively, the detector 1 may temporarily stop determining a specific signal. When the detector 1 operates again or starts monitoring a specific signal again, a new synthesized signal may be received by the reception portion and this stage may be performed.

Based on the new synthesized signal, the determination of the presence determination of the specific signal and the validity determination for the presence determination (S17) based on the new synthesized signal may be a stage of repeating monitoring of the specific signal based on the new synthesized signal.

In this stage, the acquisition of the plurality of frequency domain calculation values based (S13), the determination of the presence of the specific signal (S14), and the determination of the validity for the presence determination of the specific signal (S15) may be performed again based on the new synthesized signal.

In this connection, when the absence determination is determined again or the invalid determination is determined while this stage is in progress, the reception of the new synthesized signal (S16) may be performed after a predetermined time.

According to this embodiment, it may be particularly useful when a mixed signal in which noise and a specific signal are mixed is received by the detector 1 mounted on a mobile unit such as a vehicle, and when the absence determination or invalid determination is determined due to the influence of strong noise.

Specifically, in the case of the mobile unit, since its location is continuously moved, the distance from the signal source that caused the absence determination or the invalid determination may be significantly separated after a certain period of time.

Accordingly, even when the absence determination or invalid determination is initially determined due to the influence of noise, a new composite signal received every predetermined time may be monitored, and a valid determination may be determined when a composite signal having a reduced influence of noise is received. Accordingly, the detector 1 may promptly notify a user that a specific signal has been sensed after being freed from the influence of noise.

Figure 6:
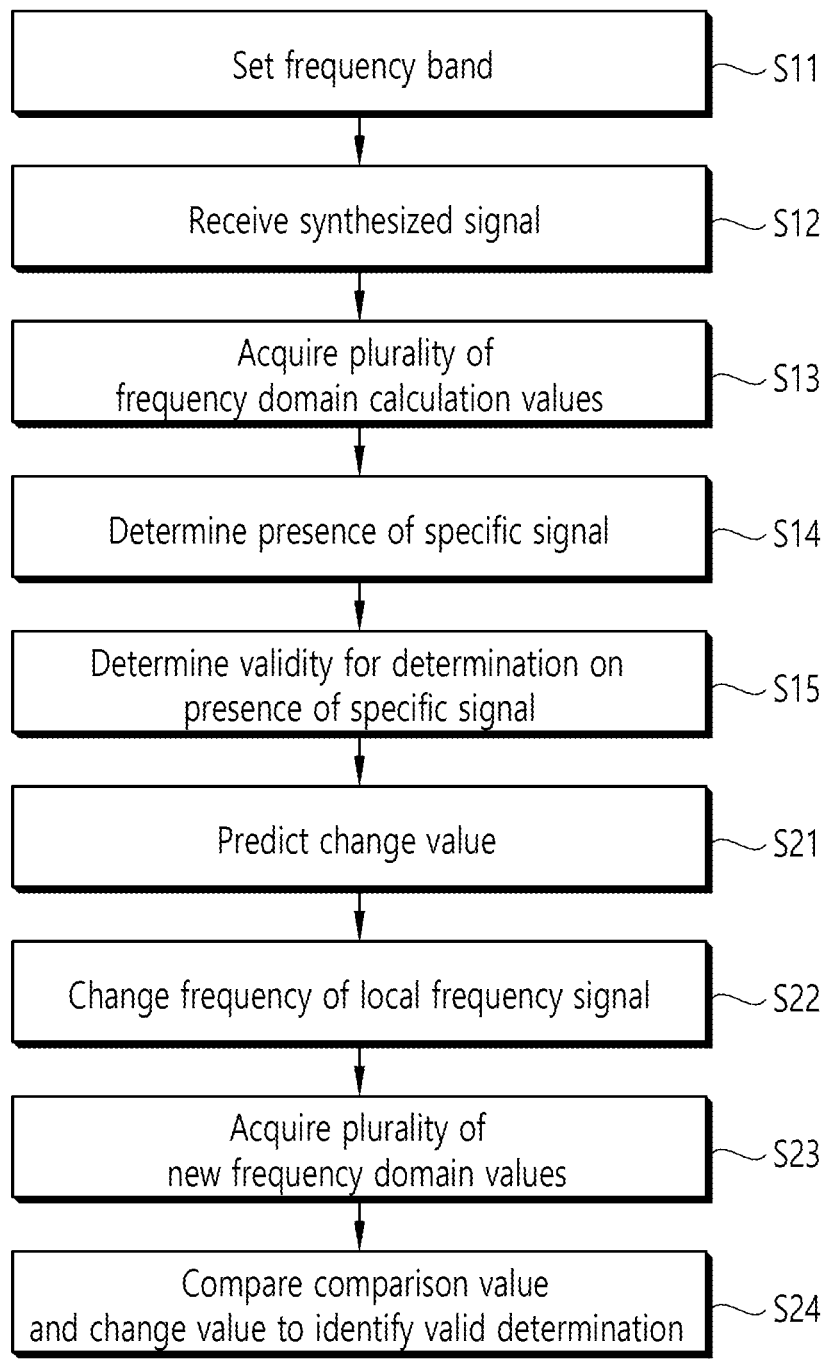
FIG. 6 is a flowchart of a method of determining validity for determination on the presence of a specific signal according to a second embodiment of the present disclosure.

Hereinafter, with reference to FIG. 6, a method of determining validity for determination on the presence of a specific signal of the detector according to a second embodiment of the present disclosure will be described. In order to avoid redundant descriptions, descriptions of the same or similar parts as those of the aforementioned embodiments are omitted. FIG. 6 is a flowchart of a method of determining validity for determination on the presence of a specific signal according to a second embodiment of the present disclosure.

As illustrated in FIG. 6, unlike the method of determining the validity for the determination on the presence of a specific signal of the detector according to a first embodiment, the method of determining the validity for the determination on the presence of a specific signal of the detector according to a second embodiment of the present disclosure may further include: predicting a change value (S21); changing a frequency of a local frequency signal (S22); acquiring a plurality of new frequency domain values (S23); and comparing a comparison value and the change value to identify a valid determination (S24).

The prediction of the change value (S21), the changing of the frequency of the local frequency signal (S22), the acquisition of the plurality of new frequency domain values (S23), the comparison of the comparison value and the change value to identify the valid determination (S24) may be performed when the valid determination is determined in the determination of the validity for the presence determination of the specific signal (S15).

Specifically, the present embodiment may further include conservatively verifying a presence determination even when the presence determination is determined to be valid. This may be particularly useful when noise is received by the detector 1 mounted on a mobile unit such as a vehicle, but the phase of the noise is similar to a specific signal at an accidental point in time and is misjudged.

In the prediction of the change value (S21), when the local frequency signal is changed, the change value of the peak value used as the basis for determining the specific signal is predicted. For example, in this stage, it is assumed that the first local frequency signal and/or the second local frequency signal are changed, and accordingly, it may be possible to predict how the peak value will be changed when FFT is performed.

Hereinafter, it is assumed that the second local frequency signal is changed from an initial frequency to a change frequency, but the present disclosure is not limited thereto. Further, in the following description, the change value is assumed to be a changed intensity value, but the change value may also be calculated as a difference value between the previous intensity value and the changed intensity value.

In this stage, the calculation portion calculates a change value of the peak value when the second local frequency signal is changed to a change frequency different from the existing frequency under the assumption that a specific signal is a continuous wave.

In the changing of the frequency of the local frequency signal (S22), the control portion may deliver a control signal so that the second oscillator 320 generates a change frequency. Accordingly, in this stage, the frequency by the second oscillator 320 may be changed to a change frequency.

In the acquisition of the plurality of new frequency domain values (S23), the new synthesized signal may be received by the reception portion 100, and the signal conversion portion 400 may receive the second output signal changed by the new synthesized signal and the changed second local frequency signal.

Thereafter, the signal conversion portion 400 may deliver a new digital signal obtained by converting the changed second output signal to the detection and control portion 500. In addition, the calculation portion may calculate a plurality of new frequency domain values based on the new digital signal.

In the comparison of the comparison value and the change value to identify the valid determination (S24), the signal determination portion may identify a comparison value corresponding to a peak value in a plurality of new frequency domain calculation values.

When the change value is equal to the comparison value or an error less than or equal to a preset error occurs, the signal determination portion may determine that the valid determination was appropriate. Conversely, when the change value is different from the comparison value or an error greater than or equal to a preset difference occurs by comparing the change value and the comparison value, the signal determination portion may determine that the valid determination was a misjudgment.

In the latter case, the signal determination portion may deliver information indicating that the valid determination was a misjudgment to the control portion. The control portion that received the information may control the second oscillator to discard the corresponding sweep of the second oscillator 320 or properly adjust a local frequency again to determine validity.

Those skilled in the technical field to which the present disclosure pertains will understand that the present disclosure may be practiced in other detailed forms without departing from the technical spirit or essential features of the present disclosure. Accordingly, it should be understood that the above-described embodiments are exemplary in all aspects rather than being restrictive. The scope of the present disclosure is defined by the following claims rather than by the detailed description of the embodiment. It shall be understood that all modifications and embodiments conceived from the meaning and scope of the claims and their equivalents are included in the scope of the present disclosure.

| Description of Reference Numerals | |
| --- | --- |
| 1: Detector | 100: Reception portion |
| 220: First oscillator | 300: Second signal processing portion |
| 310: Second mixer | 320: Second oscillator |
| 400: Signal conversion portion | 500: Detection and control portion |
| S: Specific signal | N1, N2, and N3: Noise peak values |

What is claimed is:

1. A method of determining validity for determination on presence of a specific signal of a detector, the method comprising:
   (a) receiving a synthesized signal generated from an outside by the detector;
   (b) acquiring a plurality of frequency domain calculation values related to the synthesized signal;
   (c) determining the presence of at least one specific signal based on the plurality of frequency domain calculation values; and
   (d) determining the validity for the determination on the presence of the specific signal based on a frequency domain scatter plot for the plurality of frequency domain calculation values.

2. The method of claim 1, wherein, in stage (d), the validity for the determination on the presence of the specific signal is determined by comparing the frequency domain scatter plot with a preset reference scatter plot.

3. The method of claim 2, wherein, in stage (d), the reference scatter plot and the frequency domain scatter plot is calculated and compared based on a mean absolute deviation (MAD) method.

4. The method of claim 2, wherein the reference scatter plot is measured based on a reference signal that does not include the specific signal and includes noise equal to or less than a preset intensity.

5. The method of claim 1, further comprising, in stage (d), based on an invalid determination that the determination on the presence of the specific signal is not valid:
   (e) receiving a new synthesized signal after a preset time from a time point when the invalid determination is determined; and
   (f) performing stages (b), (c) and (d) based on the new synthesized signal.

6. The method of claim 1, further comprising (g) setting a frequency band for the specific signal,
   wherein, in stage (c), the presence of the specific signal is determined based on a peak value having a critical intensity in the frequency band among the plurality of frequency domain calculation values.

7. The method of claim 6, wherein, in stage (b), the plurality of frequency domain calculation values is acquired by Fourier transforming a signal obtained by mixing a local frequency signal generated by the detector and the synthesized signal.

8. The method of claim 7, further comprising: in stage (d), based on a valid determination that the determination on the presence of the specific signal is valid:
   (h) predicting a change value of the peak value when the local frequency signal is a change frequency different from an existing frequency;
   (i) actually changing a frequency of the local frequency signal to the change frequency;
   (j) acquiring a plurality of new frequency domain values based on the change frequency; and
   (k) comparing the change value with a comparison value having a critical intensity in the frequency band among the plurality of new frequency domain calculation values, and identifying the valid determination.

9. A detector, comprising:
   a reception portion for receiving a synthesized signal generated from an outside;
   a calculation portion for acquiring a plurality of frequency domain calculation values related to the synthesized signal;
   a signal determination portion for determining presence of at least one specific signal based on the plurality of frequency domain calculation values; and
   an validity determination portion for determining validity for determination on the presence of the specific signal based on a frequency domain scatter plot for the plurality of frequency domain calculation values.

* * * * *